(12) United States Patent
Bourland

(10) Patent No.: US 9,435,133 B2
(45) Date of Patent: Sep. 6, 2016

(54) INDIVIDUAL SHOOTER SHELTER AND MAT

(71) Applicant: David W. Bourland, Camas, WA (US)

(72) Inventor: David W. Bourland, Camas, WA (US)

( * ) Notice: Subject to any disclaimer, the term of this patent is extended or adjusted under 35 U.S.C. 154(b) by 0 days.

(21) Appl. No.: 13/896,759

(22) Filed: May 17, 2013

(65) Prior Publication Data

US 2014/0150836 A1 Jun. 5, 2014

Related U.S. Application Data

(60) Provisional application No. 61/648,463, filed on May 17, 2012.

(51) Int. Cl.
| | | |
|---|---|---|
| *E04H 15/02* | (2006.01) | |
| *E04H 15/44* | (2006.01) | |
| *A01M 31/00* | (2006.01) | |
| *A01M 31/02* | (2006.01) | |
| *E04H 15/00* | (2006.01) | |

(52) U.S. Cl.
CPC ............ *E04H 15/001* (2013.01); *E04H 15/02* (2013.01); *E04H 15/44* (2013.01); *A01M 31/00* (2013.01); *A01M 31/025* (2013.01)

(58) Field of Classification Search
CPC ..... E04H 15/001; E04H 15/42; E04H 15/36; E04H 15/40; E04H 15/44; E04H 15/425; A01M 31/00; A01M 31/025
USPC ....... 135/124, 125, 126, 127, 128, 136, 137, 135/138, 156, 901; 5/417, 420
See application file for complete search history.

(56) References Cited

U.S. PATENT DOCUMENTS

| | | | | | |
|---|---|---|---|---|---|
| 2,751,609 | A | * | 6/1956 | Oesterling | ......... A47G 27/0237 5/420 |
| 3,800,814 | A | * | 4/1974 | Hibbert | ......................... 135/93 |
| 4,605,029 | A | * | 8/1986 | Russell | ................ E04H 15/324 135/125 |
| 4,719,935 | A | * | 1/1988 | Gustafson | ............... E04H 15/10 135/124 |
| 4,757,832 | A | * | 7/1988 | Russell | ..................... A45F 4/02 135/128 |
| 5,303,435 | A | * | 4/1994 | Haar | .................... A47C 27/084 5/413 AM |
| 5,562,115 | A | * | 10/1996 | Sotelo | ........................ 135/156 |
| 5,941,264 | A | * | 8/1999 | Gregg | .................. E04H 15/001 135/116 |
| 6,109,281 | A | * | 8/2000 | Lowenthal | ..................... 135/125 |
| 6,167,898 | B1 | * | 1/2001 | Larga et al. | .................. 135/137 |
| 6,895,614 | B1 | * | 5/2005 | Peck | .................. 5/419 |
| 7,127,753 | B1 | * | 10/2006 | Ramaley | ....................... 5/413 R |
| 7,146,996 | B1 | * | 12/2006 | Shires | .......................... 135/126 |
| 2001/0042563 | A1 | * | 11/2001 | Coupounas | .................. 135/124 |
| 2006/0169729 | A1 | * | 8/2006 | Reis | .............................. 224/154 |
| 2010/0306917 | A1 | * | 12/2010 | Batiste | ............................. 5/420 |
| 2012/0055525 | A1 | * | 3/2012 | Choi | ............................ 135/147 |

FOREIGN PATENT DOCUMENTS

FR        1008257 A  *  5/1952  ............... A45C 9/00

* cited by examiner

*Primary Examiner* — David R Dunn
*Assistant Examiner* — Danielle Jackson
(74) *Attorney, Agent, or Firm* — Marger Johnson

(57) ABSTRACT

A shooter shelter includes a mat, and a tent portion integrally connected to the mat.

13 Claims, 16 Drawing Sheets

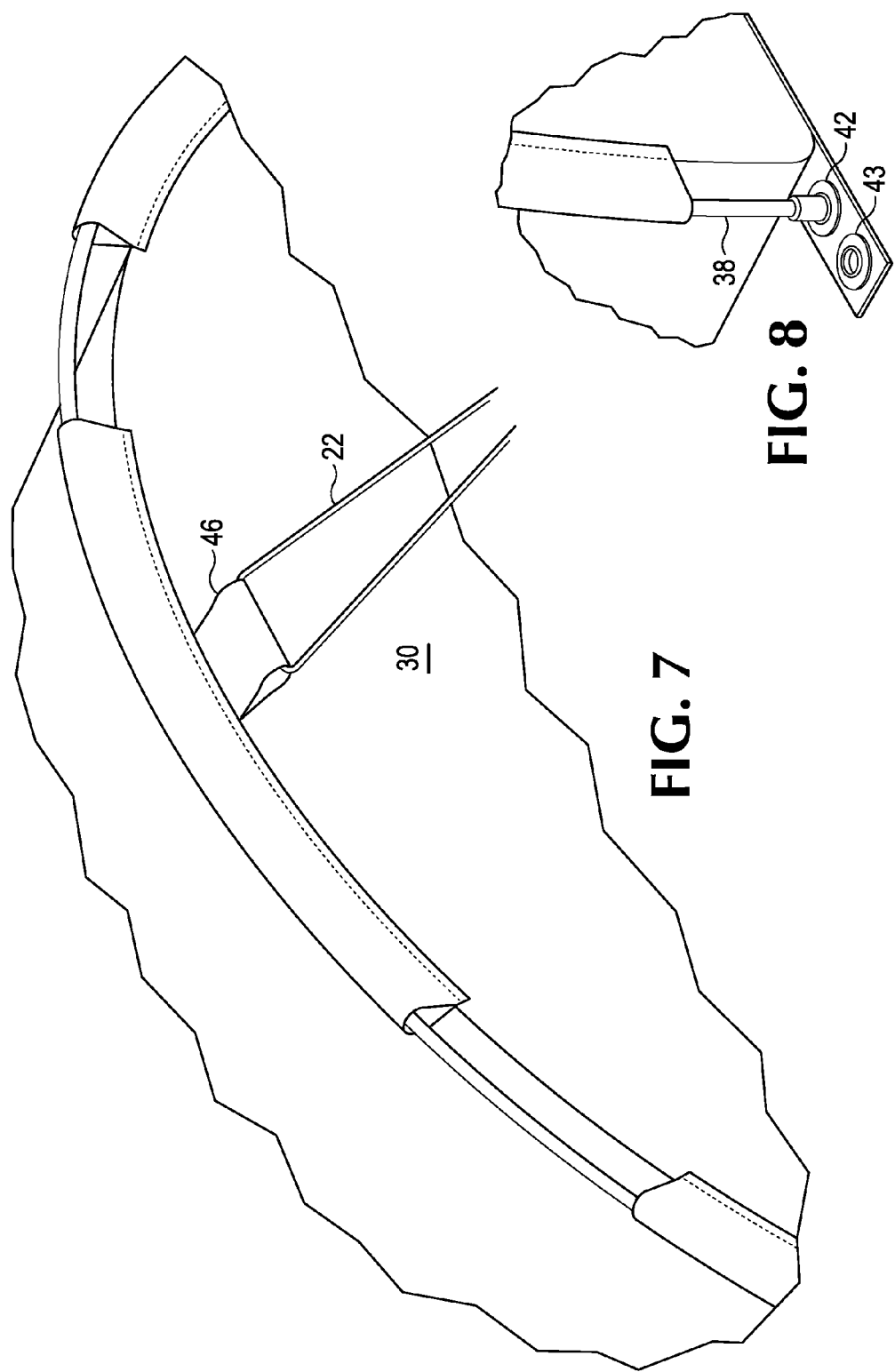

INDIVIDUAL SHOOTER SHELTER AND MAT

RELATED APPLICATION

This application claims priority to U.S. Provisional Patent Application No. 61/648,463, filed May 17, 2012, incorporated by reference in here in its entirety.

BACKGROUND

Long distance shooters, such as snipers and hunters, have higher effectiveness when they can remain at least partially hidden or undetected while waiting for, and taking, a shot. Their weapons also need to be protected from environmental factors such as moisture, dirt and other contaminants that can affect the operation of the weapon and the accuracy of the shot.

The shooters generally remain mobile until they set up in a spot, and may have to leave their spot on a moment's notice. The mobility and speed requirements means that the equipment they carry must be lightweight, quick to set up and take down, and easy to transport from one point to another. In tactical environments, the shooter may need his hands to operate his weapon to defend himself while on the move. The equipment would generally requires some sort of strapping or fasteners that allow the shooter to mount it on their load bearing equipment, such as a belt, suspenders, pack, or any combination of those elements.

It would be useful for the shooter to have a portable hide or shelter that allowed the shooter to remain undetected for long periods of time and protect shooters and their weapons from the environment. The portable hide or shelter would need to be lightweight, quick to assembly and breakdown, and mountable upon the shooter's carrying gear.

BRIEF DESCRIPTION OF THE DRAWINGS

FIG. 7 shows a view of a top connector and support cable of an embodiment of a portable shooter shelter and mat.

FIG. 8 shows a view of a bottom connector and a support pole base of an embodiment of a portable shooter shelter and mat.

DETAILED DESCRIPTION OF THE EMBODIMENTS

Figure 1:
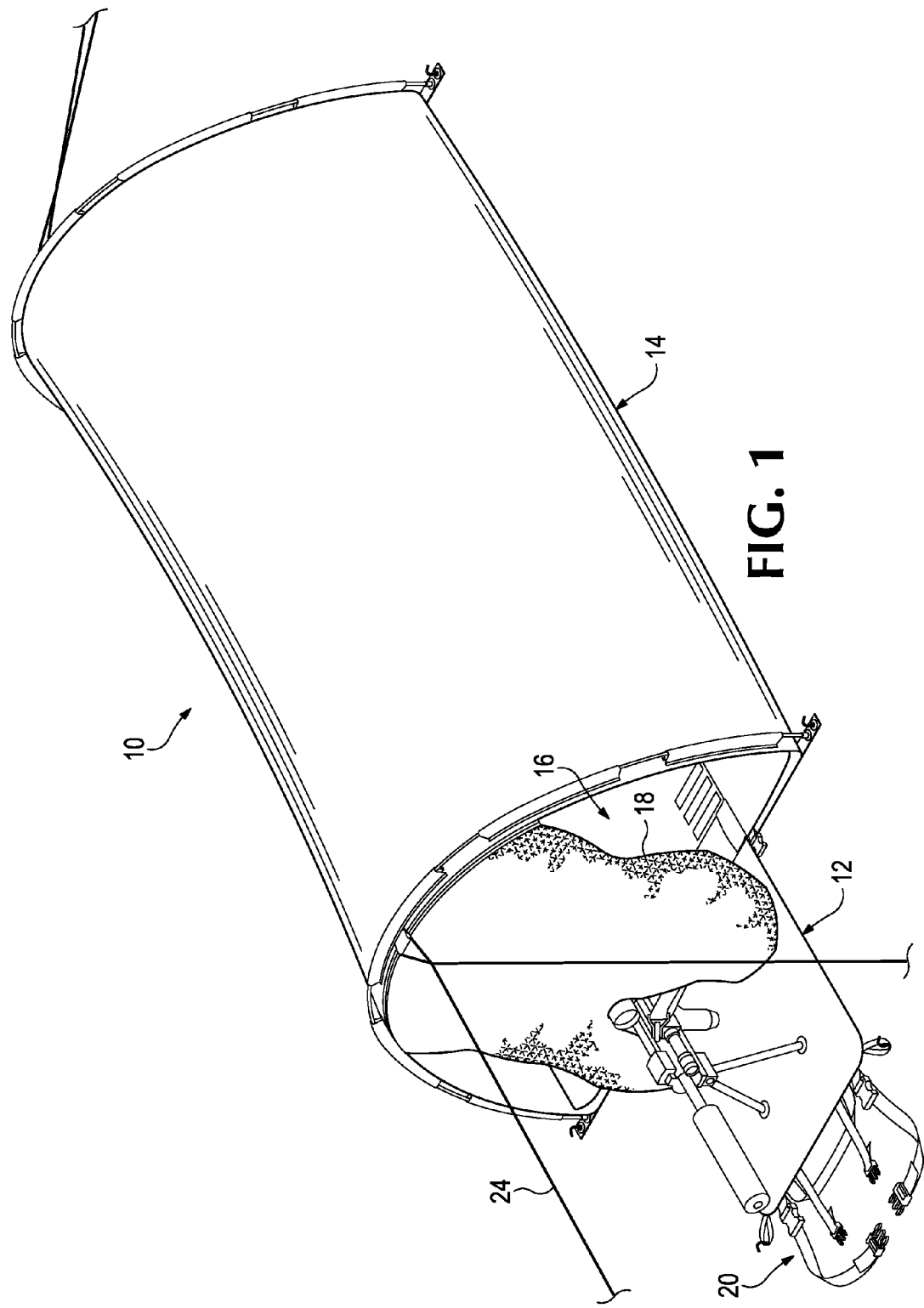
FIGS. 1-5 show front views of an embodiment of an erected portable shooter shelter and mat.

FIG. 1 shows an embodiment of a shooter shelter and mat. The shelter and mat are integrated into one item and may therefore be referred to from here on as a shooter shelter. Generally, the embodiments here encompass portable shelters with mats, but the discussion intends for other variations and modifications to be included as part of the scope of the embodiments. These variations and modifications will be discussed in more detail further.

The shooter shelter and mat provides a combined environmental shelter and shooter's mat designed for military, government, law enforcement and sportsmen. The shelter is a waterproof, one-man tent with a removable shooter's mat/sleeping pad. The shelter and mat are backpack compatible, lightweight and of compact size.

In one embodiment the general dimensions of the shelter and mat when rolled and fastened in the carrying configuration are 21 inches wide and 8-9 inches in diameter. The materials used are waterproof or water resistant and the total weight is approximately 5.5 pounds. The material may consist of neoprene, nylon, rip stop nylon, etc. Any lightweight and waterproof material may be used.

In FIG. 1, the shelter 10 consists of a mat 12, a tent portion 14 that erects using a collapsible tent pole, forming an interior compartment 16. In the embodiment shown here, a shooter's veil covers the front of the compartment and a part of the mat that extends beyond the interior compartment as shown, providing cover for both the shooter and the weapon. The veil may consist of many different materials, the embodiment here shows camouflage netting. In addition, the color pattern or camouflage pattern may consist of many different patterns and colors depending upon the environment in which the shooter is operating. The shelter may be used without the poles to form with the surrounding terrain while still maintaining a waterproof barrier. The stake lines used to hold up the tent take a "V" shape to assist the shooter in anchoring the tent. They also can assist the shooter in setting limits on the fields of fire. For example, a shooter may need to define a limit to one side to avoid friendly troops, or a hunter that wants to avoid firing over a road. As will be discussed in more detail later, the shelter and mat also have a carrying component 20.

Figure 2:
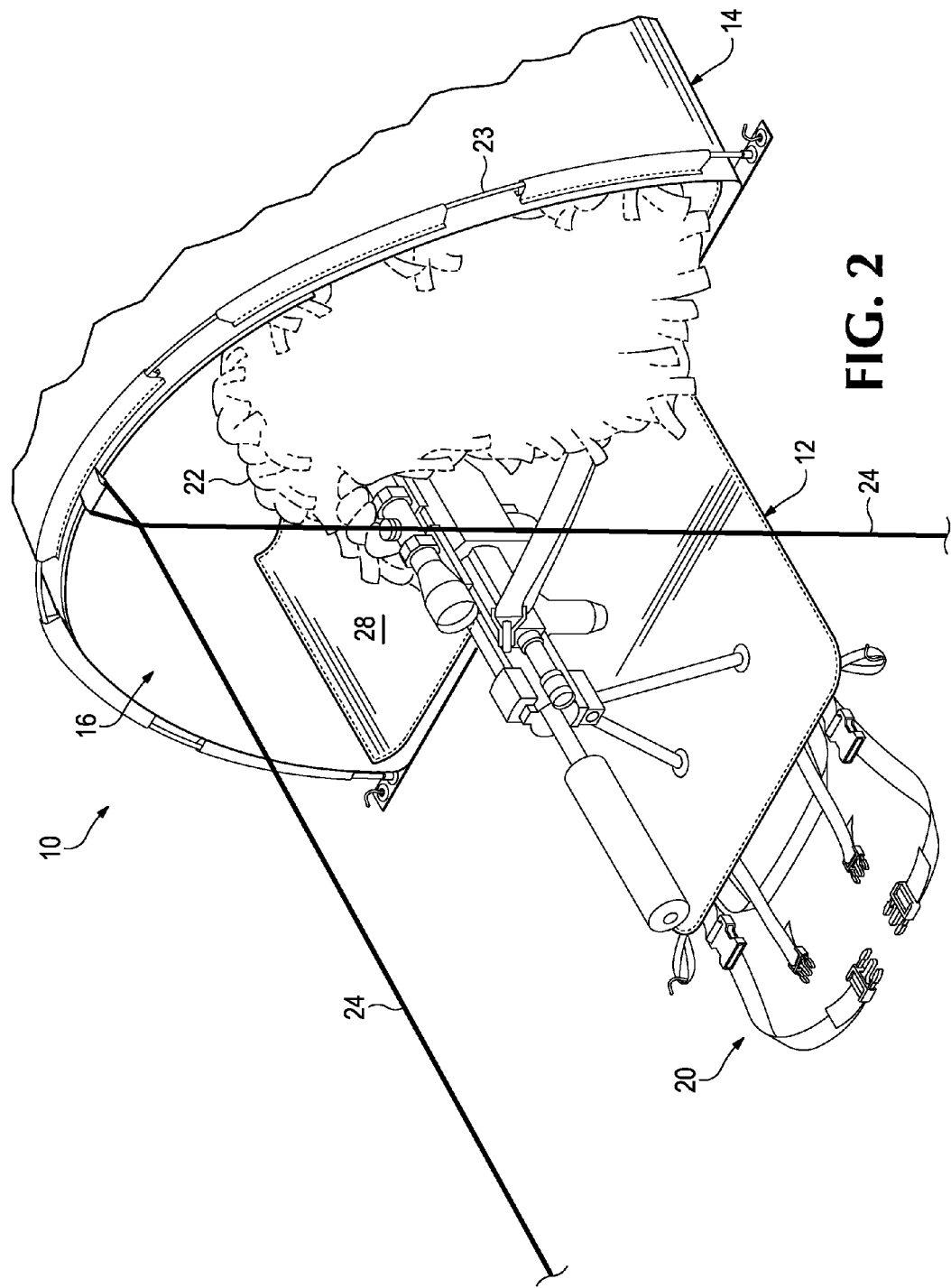

FIG. 2 shows a view of the shooter shelter when the shelter is manned by a shooter. In this instance, the shooter is wearing a Ghillie suit used by snipers to resemble foliage and allow the sniper to move through woodland areas undetected. The shooter shelter may or may not be used with the veil 18 of FIG. 1.

Figure 3:
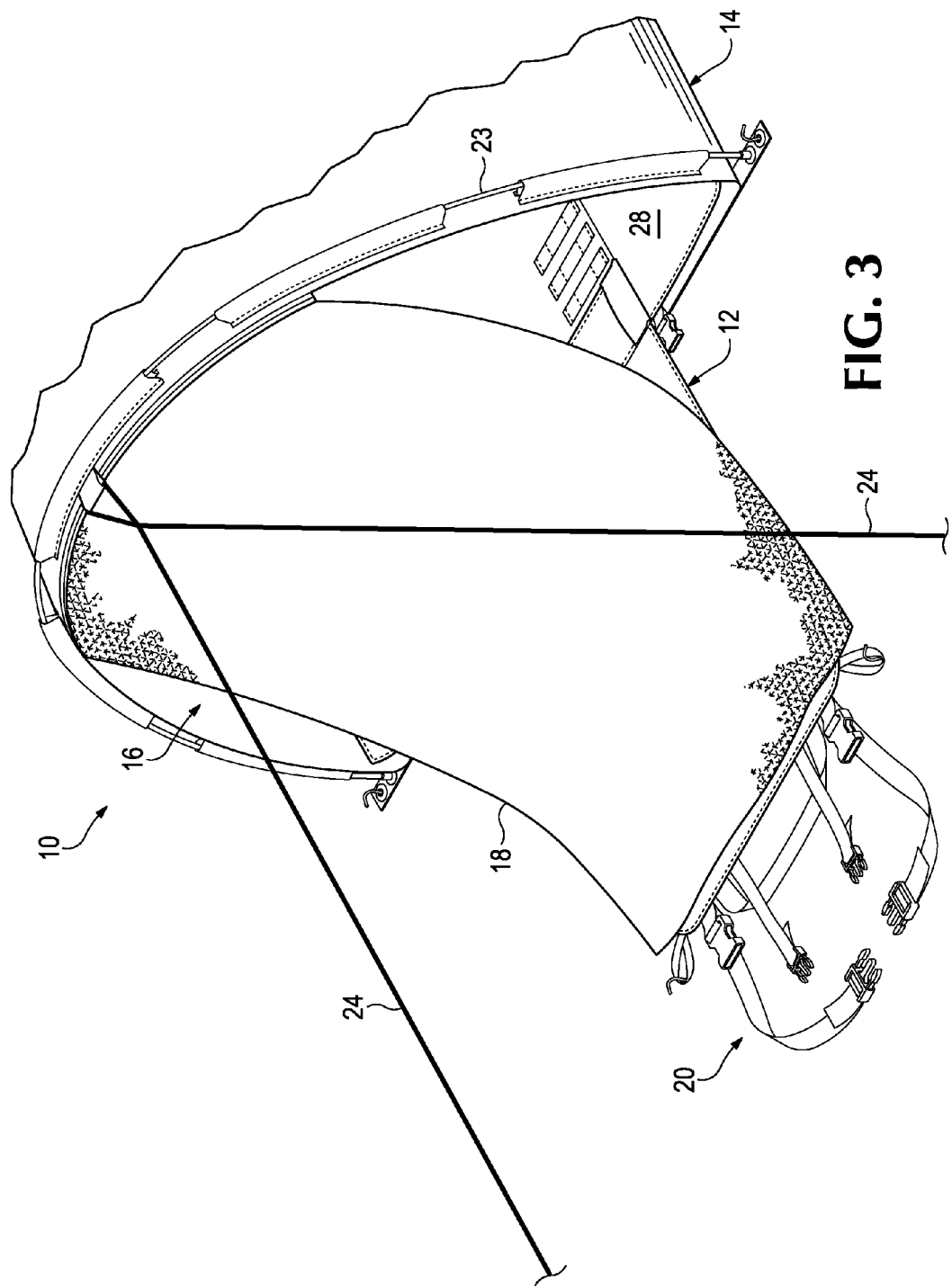
Figure 4:
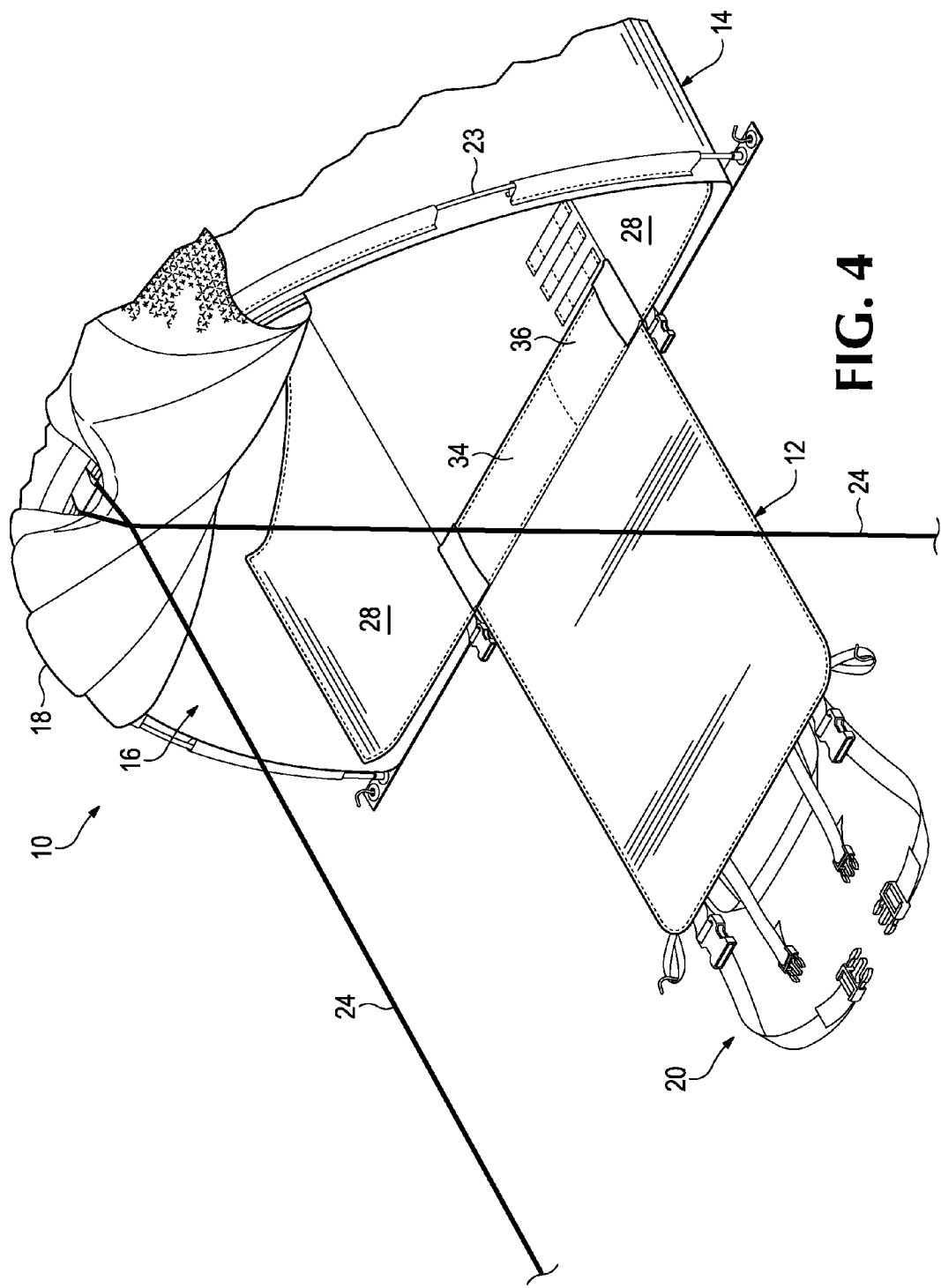
Figure 5:
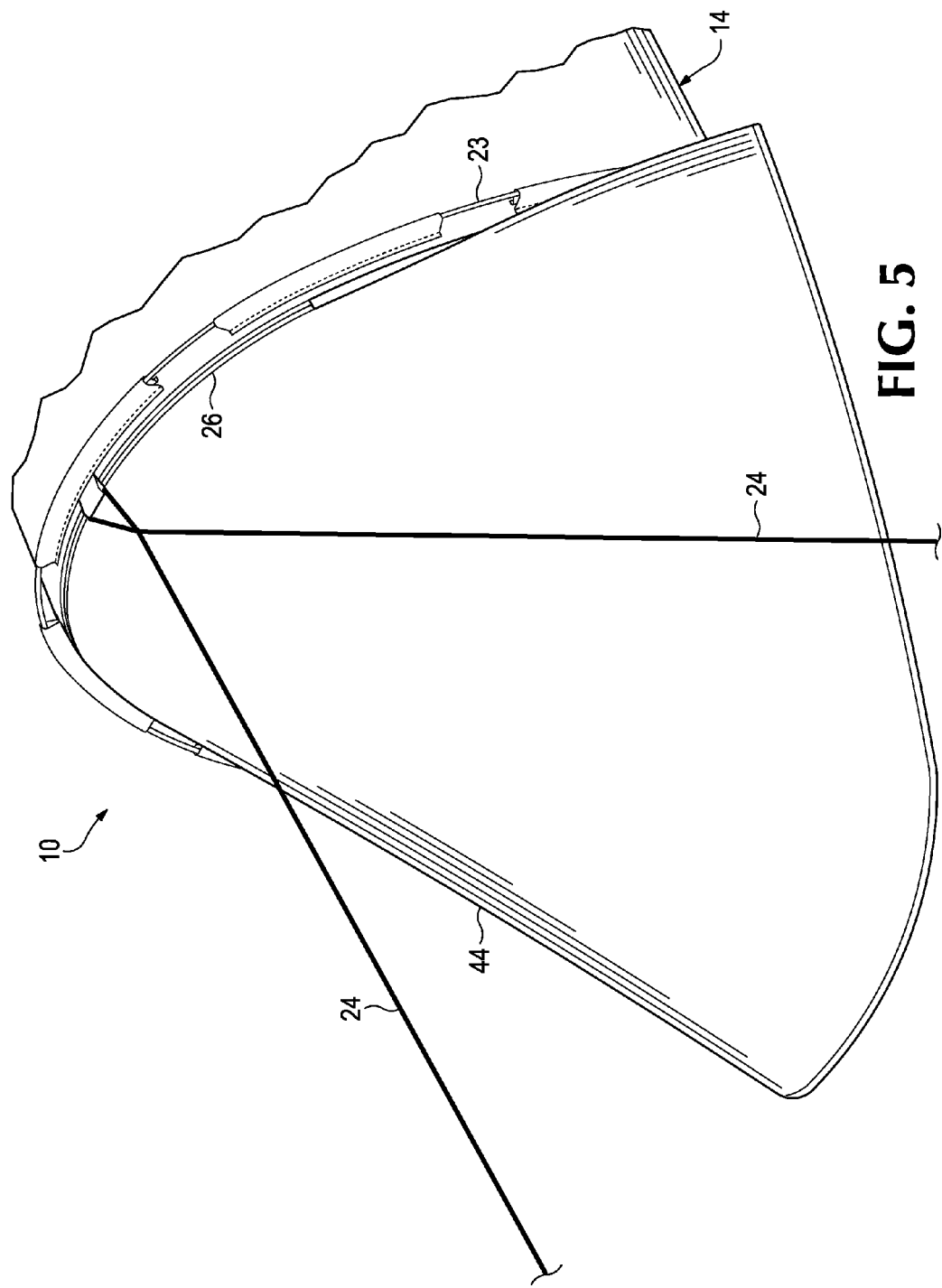

FIG. 3 shows a side view of the shooter shelter. The opening to the compartment is made here using a collapsible, elastic corded tent pole a portion 23 of which may be visible through the shelter, the tent pole 38 being discussed in more detail in FIG. 8, supported by a front support cable 24. The back will have a similar structure, as discussed further. One should note that other means of supporting the tent portion of the shelter may be used and are considered within the bounds of the embodiments here. FIG. 4 shows a different vantage point to provide a better view of the interior compartment 16.

FIGS. 3 shows a side view of the shooter shelter. The front opening to the compartment is made here using a collapsible, elastic corded tent pole 23 supported by a front support cable 24. The back will have a similar structure, as discussed further. One should note that other means of supporting the tent portion of the shelter may be used and are considered within the bounds of the embodiments here. FIG. 4 shows a different vantage point to provide a better view of the interior compartment 16.

Figure 6:
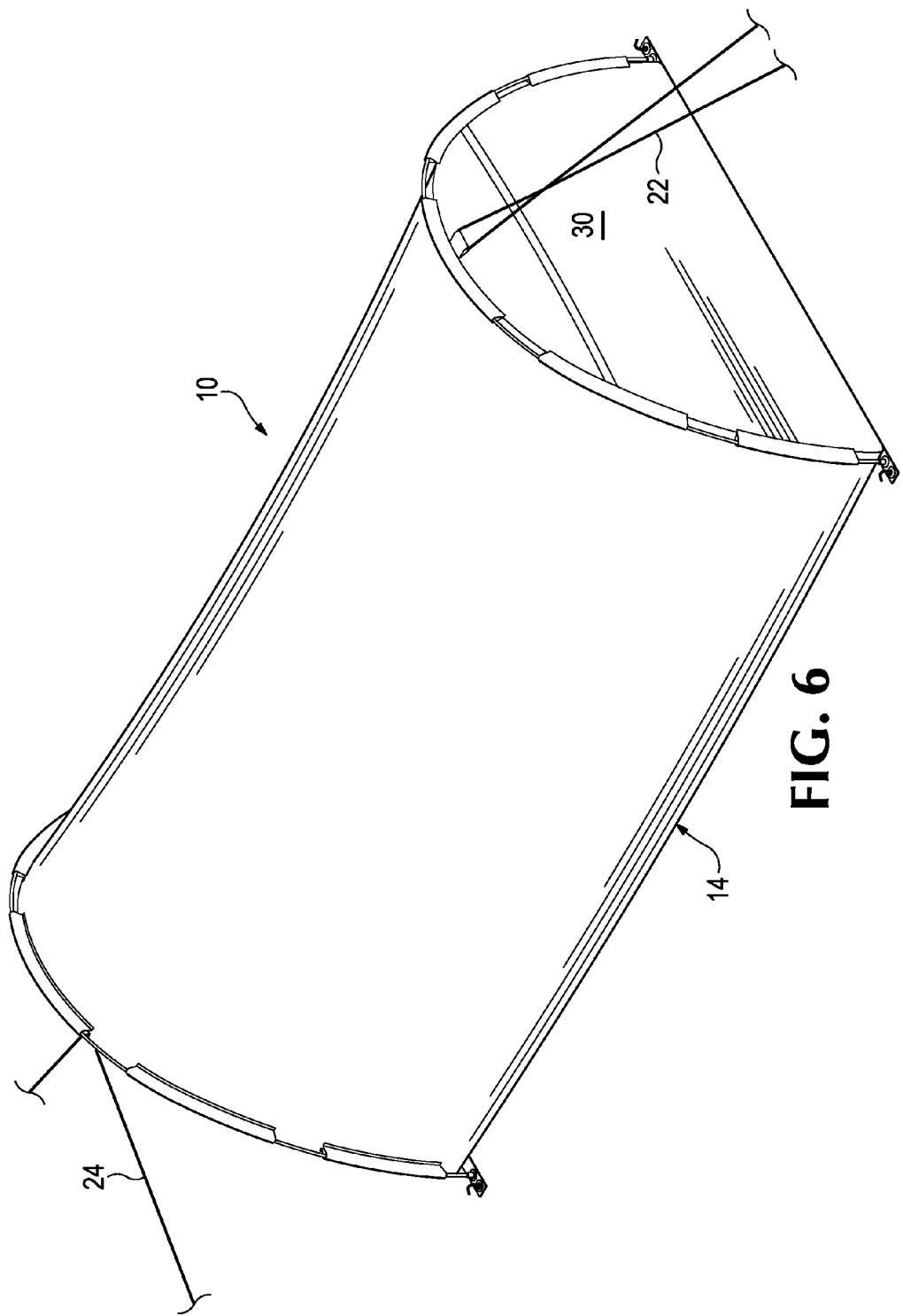
FIG. 6 shows a back, external view of an embodiment of an erected portable shooter shelter and mat.

FIG. 6 shows a rear view of an erected shooter shelter and mat. The support cable 22 pulls the rear panel 30 in the opposite direction of the other support cable 22, keeping the tent interior open. Typically, the rear panel 30 will be an integral part of the shelter, having been sewn or otherwise attached to the other portions of the tent, rather than zipped together like the front. However, no limitation to this is intended, nor should any be inferred.

FIG. 6 shows a rear view of an erected shooter shelter and mat. The support cable 22 pulls the rear panel 30 in the opposite direction of the other support cable 22, keeping access to the tent interior open. Typically, the rear panel 30 will be an integral part of the shelter, being sewn or otherwise attached to other portions of the tent, rather than zipped to the tent portion like the front.

FIG. 8 shows a closer view of the collapsible tent pole, shown here as 38, where it slides into the pole connector 42 on the bottom of the shelter portion. As will be discussed in more detail later, the pole connector 42 lies adjacent a ground stake connector 43 that allows the entire shelter to be staked into the ground.

Figure 9:
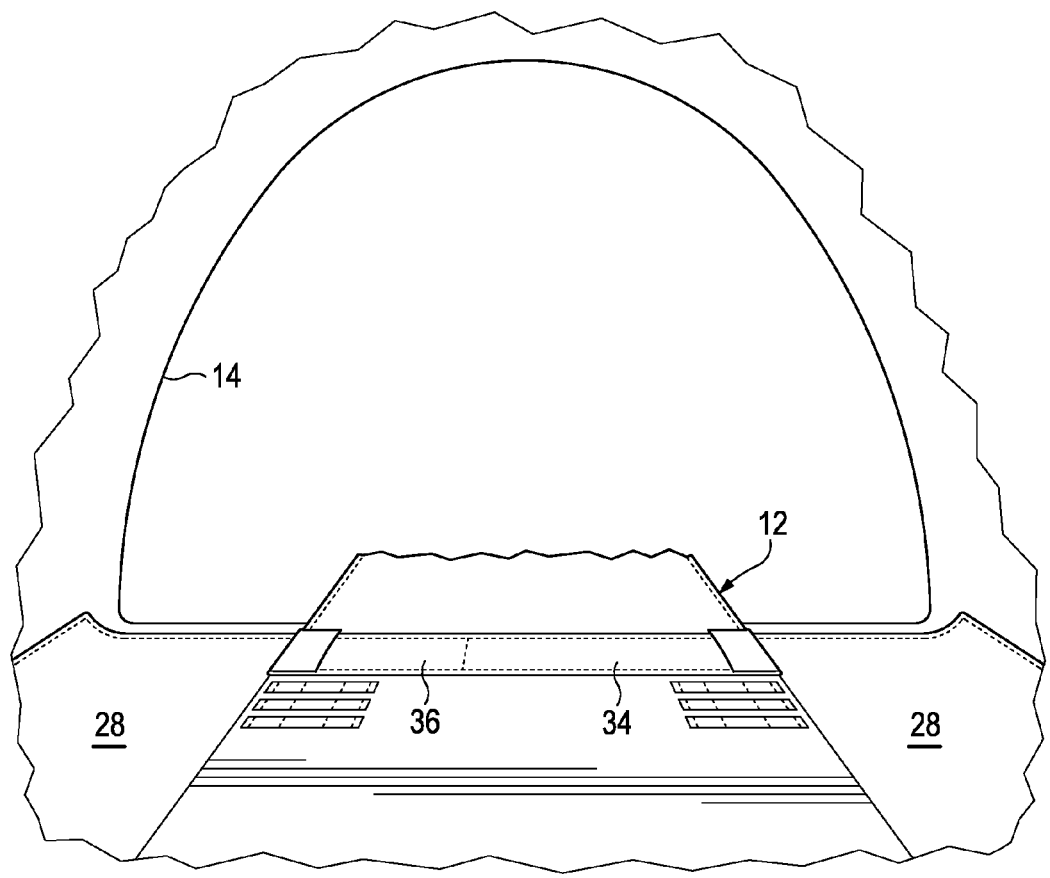
FIGS. 9 and 10 show internal views of an embodiment of an erected portable shooter shelter and mat.
Figure 10:
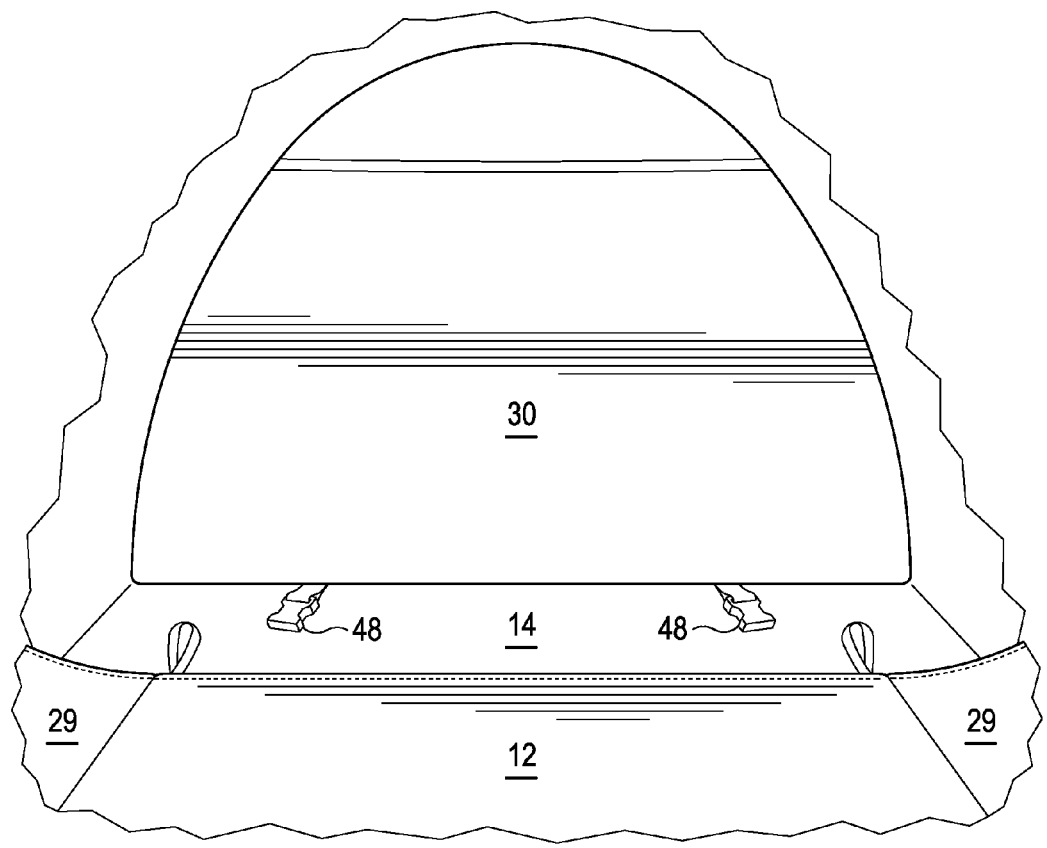
Figure 11:
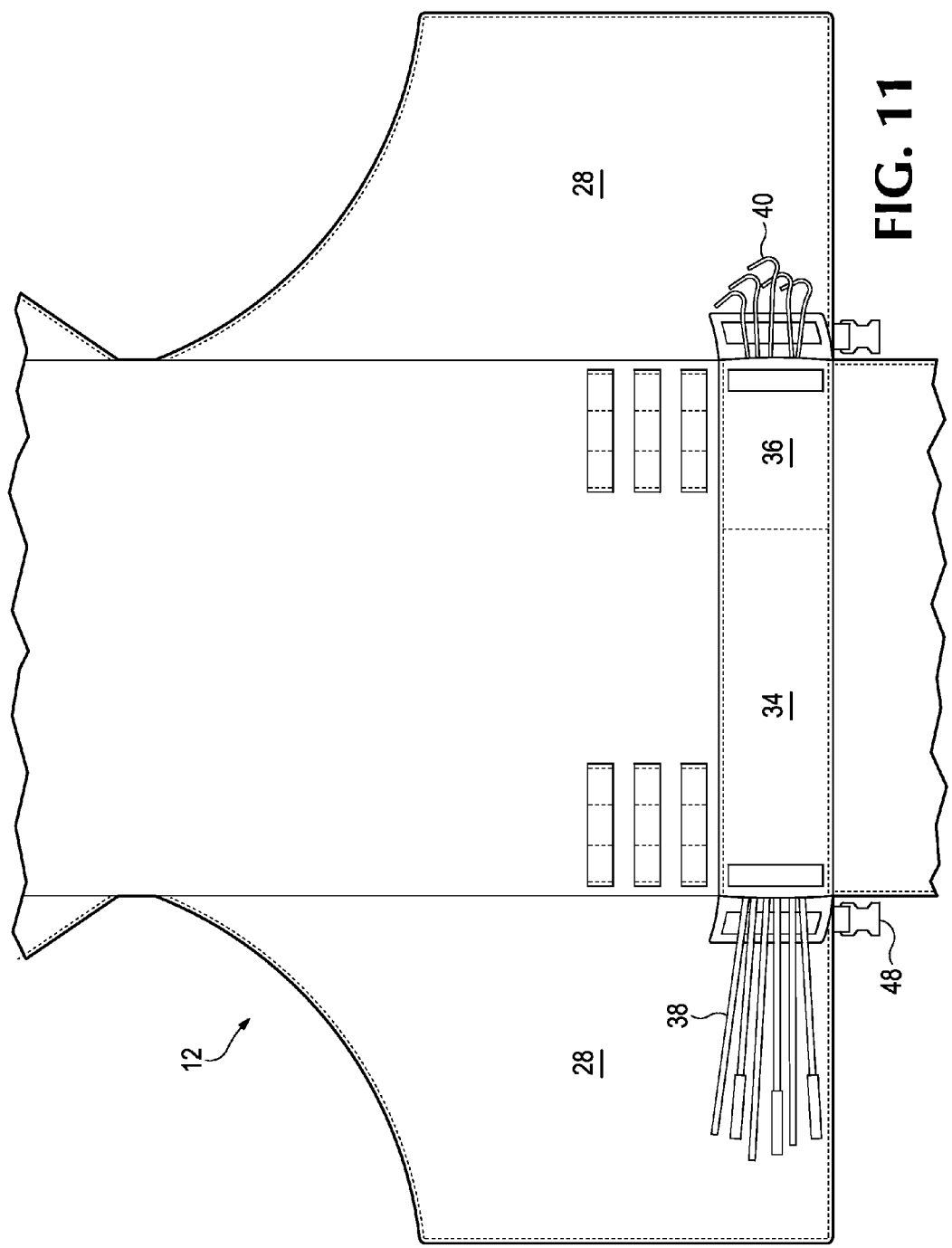
FIGS. 11-15 show various views of an embodiment of a portable shooter shelter and mat when not erected.

FIG. 9 shows another interior view of the shelter. The tent portion 14 forms the roof, with side panels 28 and the mat 12 making up the rest of the shelter. FIG. 10 shows the back portion of the interior with the buckles 48. This is how the shelter appears prior to being broken down and packed. FIG. 11 shows one view of the shelter in its broken down configuration.

Figure 12:
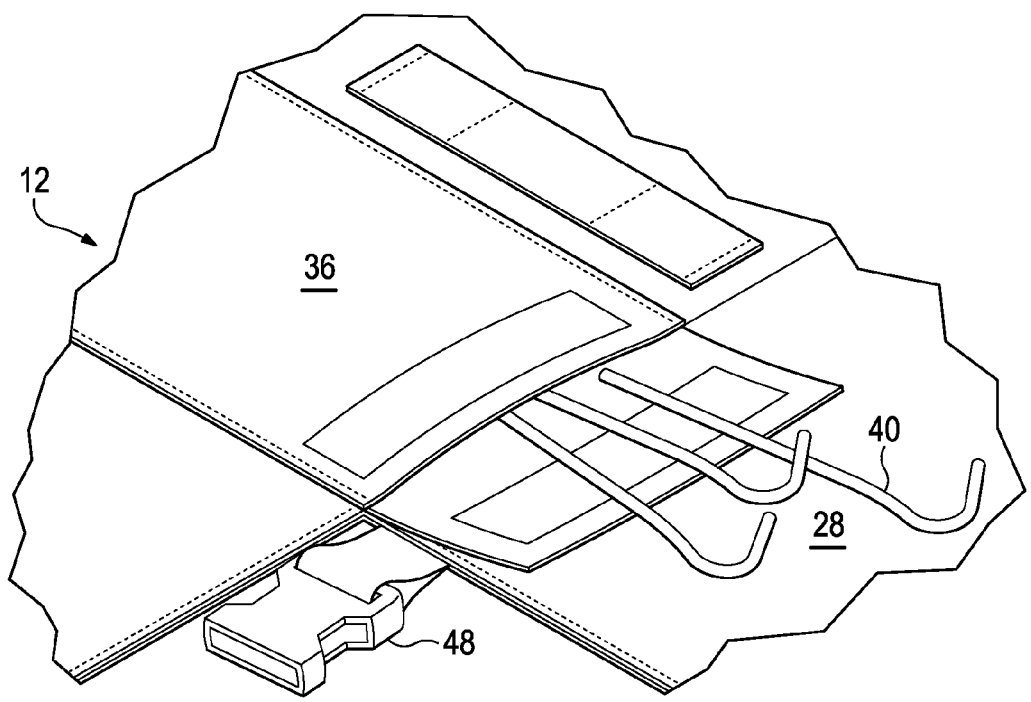
Figure 13:
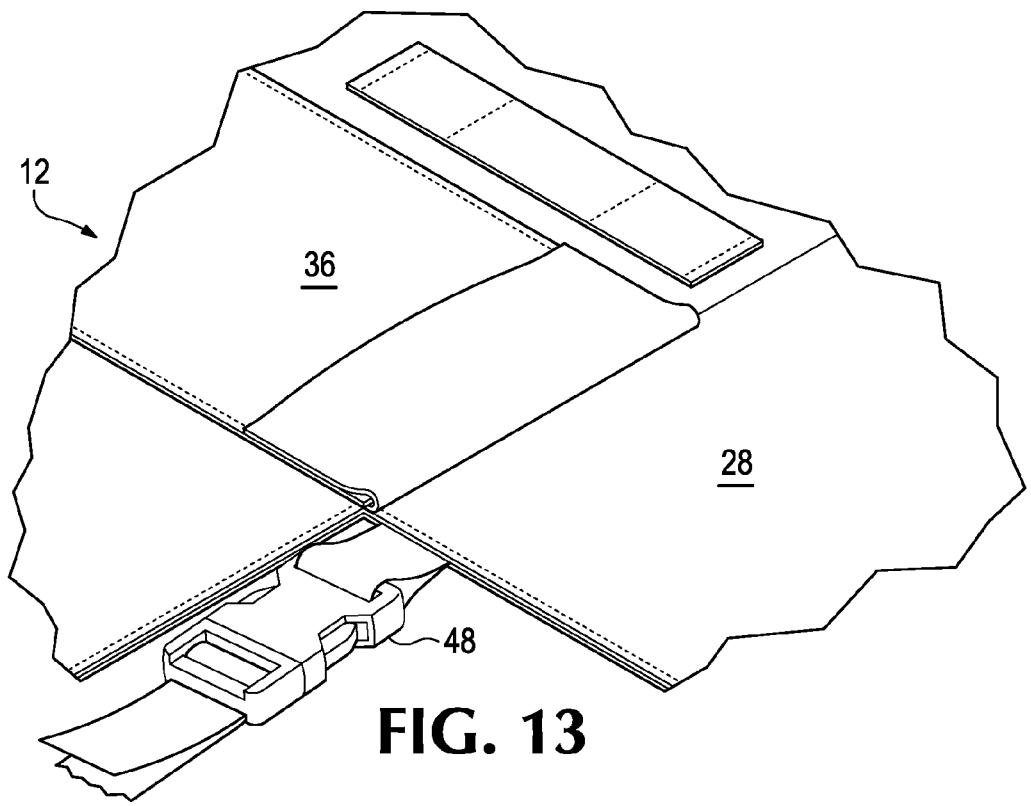
Figure 14:
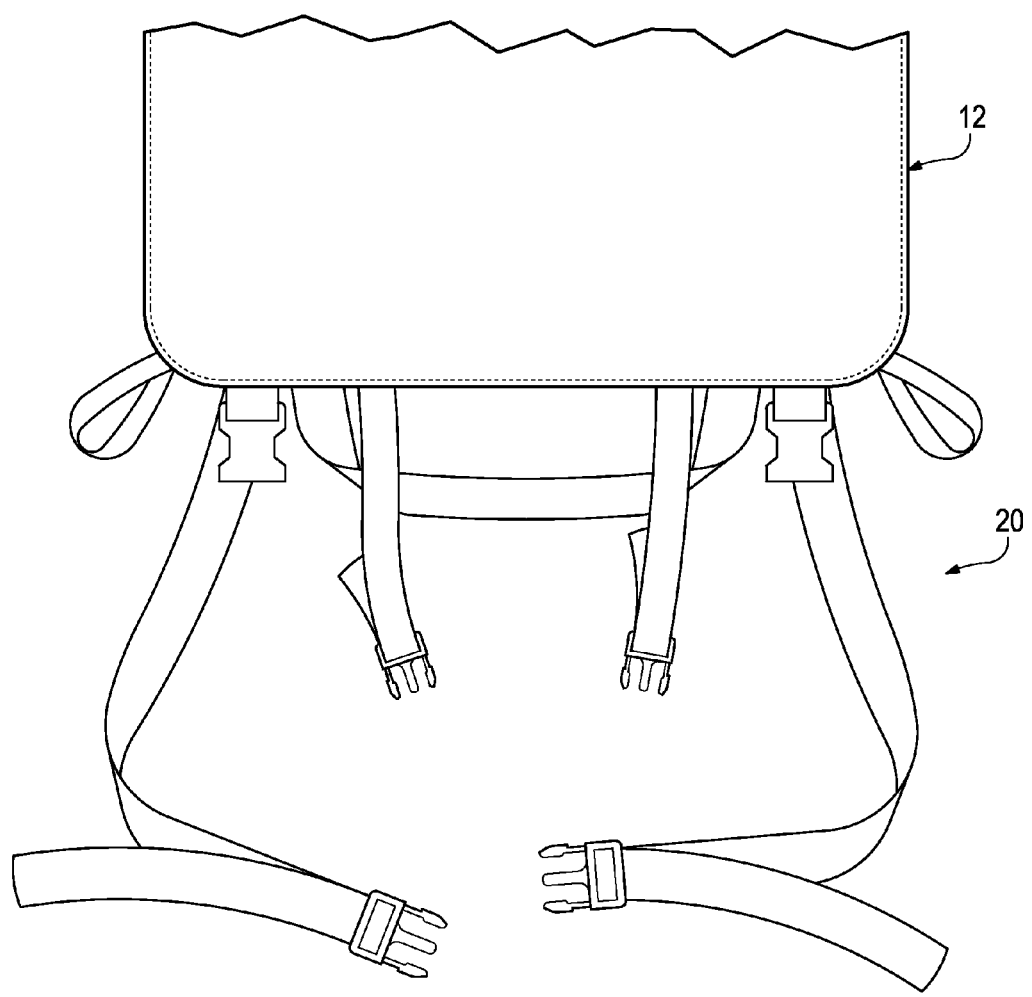

In FIG. 11, one can see that the tent pole 38 is collapsed into sections and slid into a pocket 34 integrated into the front of the mat. The tent pole is shown extending from the pocket, but in reality would be completely contained in the pocket. Similarly, the tent stakes 40 are shown extending from a second pocket 36, but will be contained entirely within the pocket. A closer view is shown in FIG. 12. FIG. 13 shows the closed pocket and the one of the buckles 48 that will be used to pack the shelter and mat into its carrying configuration. FIG. 14 shows a more detailed view of the carrying apparatus 20, consisting here of packing and carrying straps.

Figure 15:
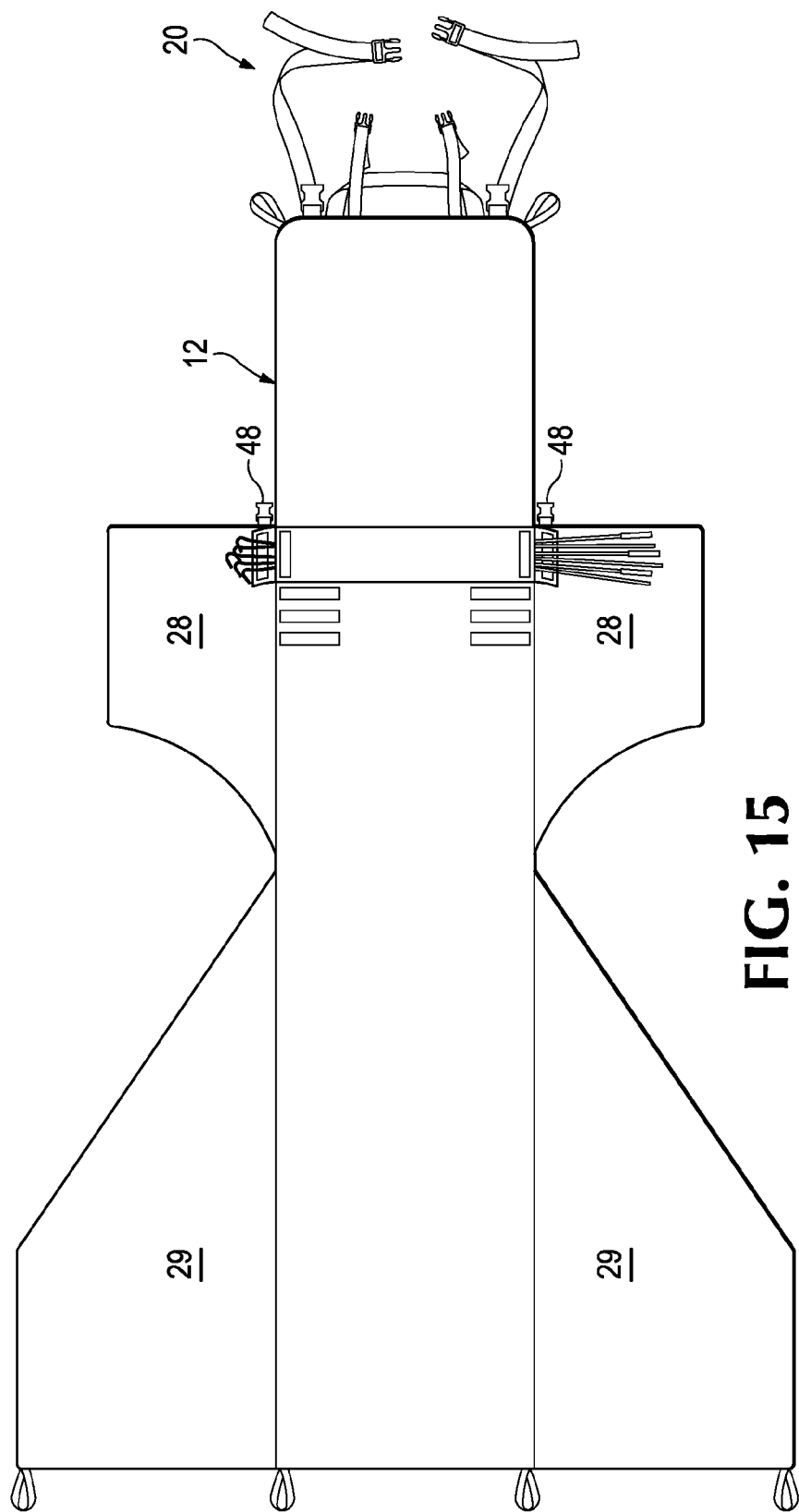

In FIG. 15, the tent portion has been removed. FIG. 15 shows an overhead view of the mat 12 removed from the shelter. The leg panels 29 extend outward into their deployed position. The arm panels 28 are shown extended. The arm panels may be covered with a non-skid surface to allow the shooter to form a firm platform of his arms for operating the weapon. The tent pole and stakes would be inserted into the pockets, and the side panels folded inwards to form a long rectangle. The mat portion 120 of the mat 12 folds back onto the center section 122 as well. The shelter is then rolled from the left side of the drawing to the right, and fastened in its rolled configuration by the buckles 48, as shown in FIG. 16.

Figure 16:
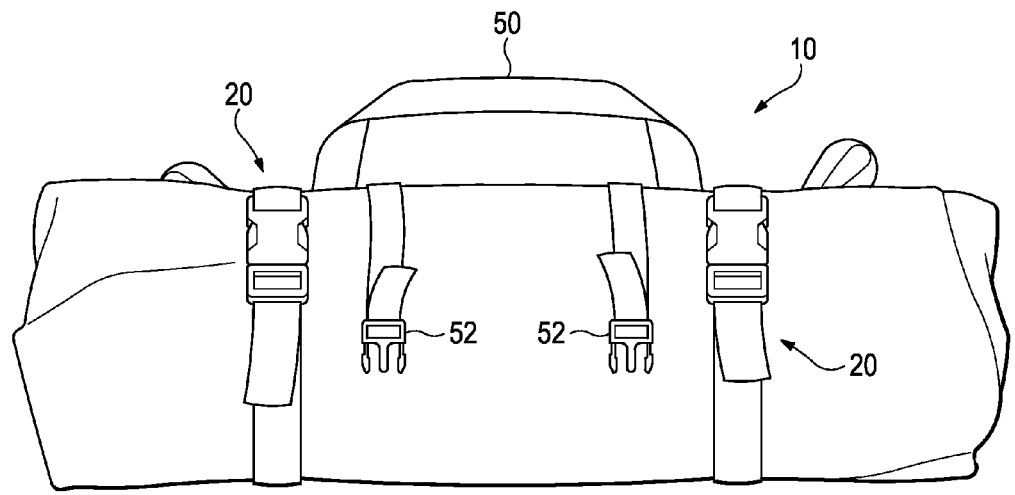
FIGS. 16-17 show views of an embodiment of a portable shooter shelter and mat in a carrying configuration.
Figure 17:
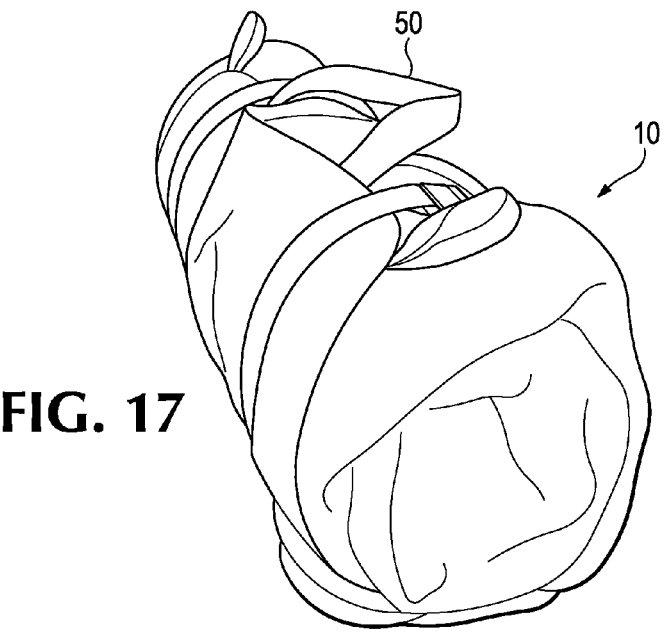
Figure 18:
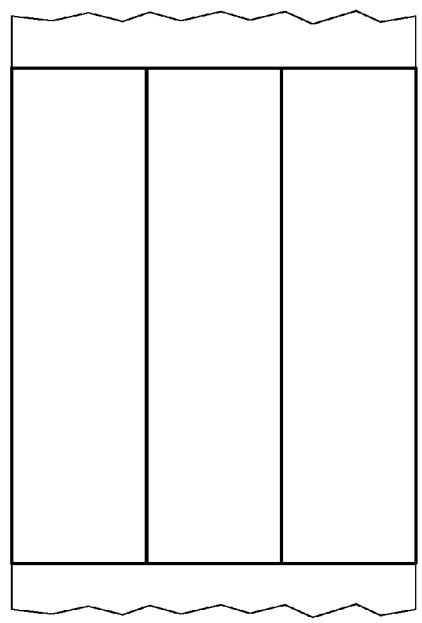
FIGS. 18-21 show embodiments of cutting patterns laid out for components of a portable shooter shelter and mat.
Figure 19:
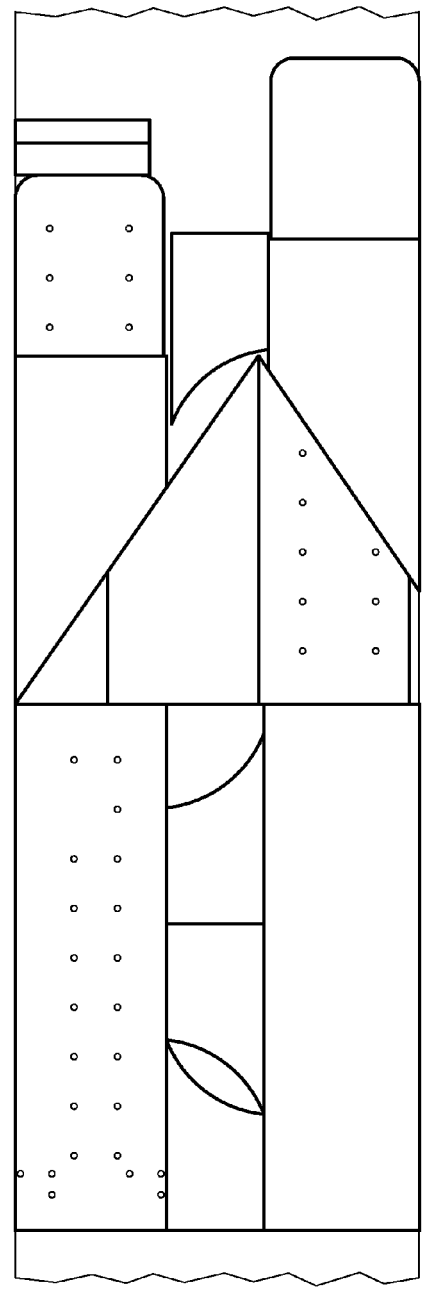
Figure 20:
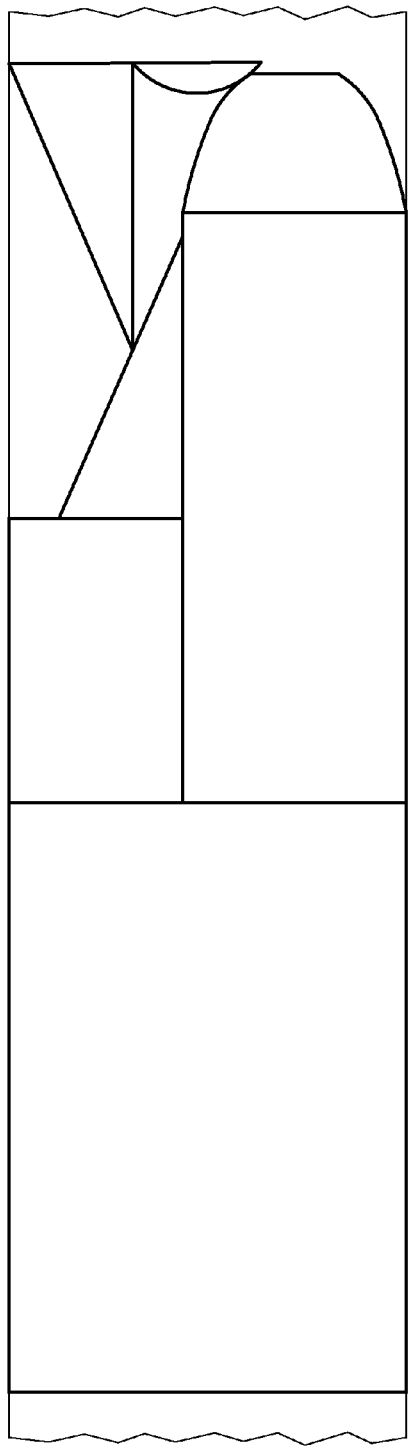
Figure 21:
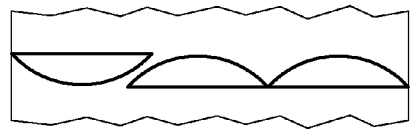

FIGS. 16 and 17 show the shelter in its rolled, or carrying, configuration. The carrying component 20 in this embodiment consists of buckles, straps and a handle. The shelter may be carried by the handle 50, or connected by backpack straps 52 to a shooter's backpack, suspenders or other load bearing equipment. In this manner, a portable, lightweight, quick setup and takedown structure is provided.

FIGS. 18-21 show patterns of the various components of a portable shooter shelter and mat laid out on a standard 61" roll of material. The components are placed and laid out to maximize the efficient use of the stock and the cutting process.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the claims here.

What is claimed is:

1. A shooter shelter, comprising:
    a mat comprising a rectangular center portion having elongated sides and shorter sides, at least one arm panel positioned to provide support for an arm of the user in a shooting position, at least one leg panel positioned to provide support for a leg of the user in a shooting position, and a front portion of the mat extending from one of the shorter sides of the center portion;
    the at least one arm panel connects to one of the elongated sides of the rectangular center portion and the at least one leg panel connects to at least one of the elongated sides of the rectangular center portion, the front portion of the mat including at least one buckle; and
    a tent portion forming an interior compartment over the center portion of the mat, the tent portion having a front opening, the front portion of the mat extending outside the interior compartment and at least two interchangeable, removable covers connectable to the front opening, wherein at least one of the two removable covers comprises a veil sized to provide cover for the part of the mat extending from the interior compartment.

2. The shooter shelter of claim 1, further comprising at least one collapsible tent pole, the tent portion having inserts to connect the tent pole to the tent portion.

3. The shooter shelter of claim 2, wherein the at least one tent pole comprises two tent poles and the tent portion has inserts adjacent the front opening and a rear panel to attach the tent poles to the tent portion.

4. The shooter shelter of claim 1, further comprising the arm panel covered with non-skid material.

5. The shooter shelter of claim 1, further comprising stake lines attachable to the tent portion.

6. The shooter shelter of claim 1, further comprising a rear panel of the tent portion opposite the front opening.

7. The shooter shelter of claim 1, wherein the tent portion and the mat comprises camouflage material.

8. The shooter shelter of claim 1, further comprising a pocket in one of either the tent portion or the mat portion, the pocket dimensioned to hold at least a collapsible tent pole.

9. The shooter shelter of claim 8, wherein the pocket is dimensioned to hold the collapsible tent pole and a set of tent stakes.

10. The shooter shelter of claim 1, further comprising a zipper at a top of the shelter.

11. The shooter shelter of claim 1, wherein one of the at least two removable covers comprises a rain fly.

12. The shooter shelter of claim 1, further comprising a carrying component.

13. The shooter shelter of claim 12, wherein the carrying component comprises at least one buckle, at least one strap and at least one handle.

* * * * *